United States Patent [19]
Matsumoto et al.

[11] 3,735,709
[45] May 29, 1973

[54] BRANCHING AND JOINING APPARATUS IN AUTOMATIC CARRYING SYSTEM

[75] Inventors: Mikio Matsumoto, Ashiya; Kenji Terada, Suita; Mitsuru Matsunaga, Neyagawa, all of Japan

[73] Assignee: Tsubakimato Chain Company, Joto-ku, Osaka, Japan

[22] Filed: Nov. 23, 1971

[21] Appl. No.: 201,449

Related U.S. Application Data

[62] Division of Ser. No. 769,320, Oct. 21, 1968, Pat. No. 3,646,613.

[30] Foreign Application Priority Data

Oct. 31, 1967 Japan ............................ 42/69578
Oct. 31, 1967 Japan ............................ 42/17299

[52] U.S. Cl. .................. 104/130, 200/16 A, 318/475
[51] Int. Cl. ................................................. E01b 26/00
[58] Field of Search .................. 104/130, 88; 318/475, 626, 630, 468, 469, 266, 267; 200/16 A

[56] References Cited

UNITED STATES PATENTS

| | | | |
|---|---|---|---|
| 2,903,972 | 9/1959 | Schutze | 104/130 X |
| 3,204,170 | 8/1965 | Monks | 318/267 |
| 3,369,087 | 2/1968 | Eller | 318/469 X |
| 2,747,034 | 5/1956 | Machon et al. | 200/16 A |
| 3,340,821 | 9/1967 | Wesener | 104/88 |

Primary Examiner—Gerald M. Forlenza
Assistant Examiner—George H. Libman
Attorney—E. F. Wenderoth, John E. Lind and V. M. Creedon et al.

[57] ABSTRACT

A branching and joining apparatus for use in an automatic carrying system including an electromotive carrier adapted to move along a main rail and at least one sub-rail, said apparatus comprising movable rails located at a location where a branching or joining operation takes place, said movable rails being positively locked at one of a "straight-forward" and a "-branching and joining" positions with a spring substantially compressed, or at the other of said positions with the spring substantially stretched. Said main rail and sub-rail are associated with means for detecting the position of the movable rails.

2 Claims, 12 Drawing Figures

MIKIO MATSUMOTO,
KENJI TERADA and
MITSURU MATSUNAGA,
INVENTORS

MIKIO MATSUMOTO,
KENJI TERADA and
MITSURU MATSUNAGA,

INVENTORS

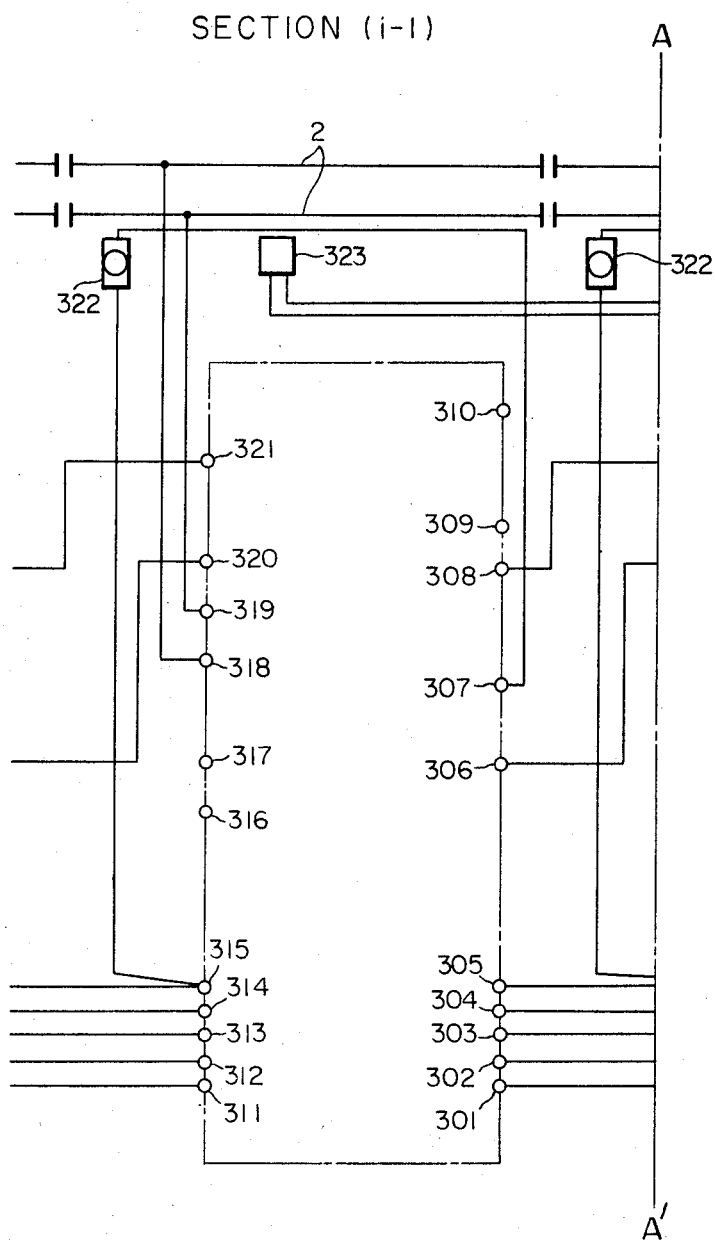
Fig. 2A-(1)
SECTION (i-1)

Fig. 2A-(2)
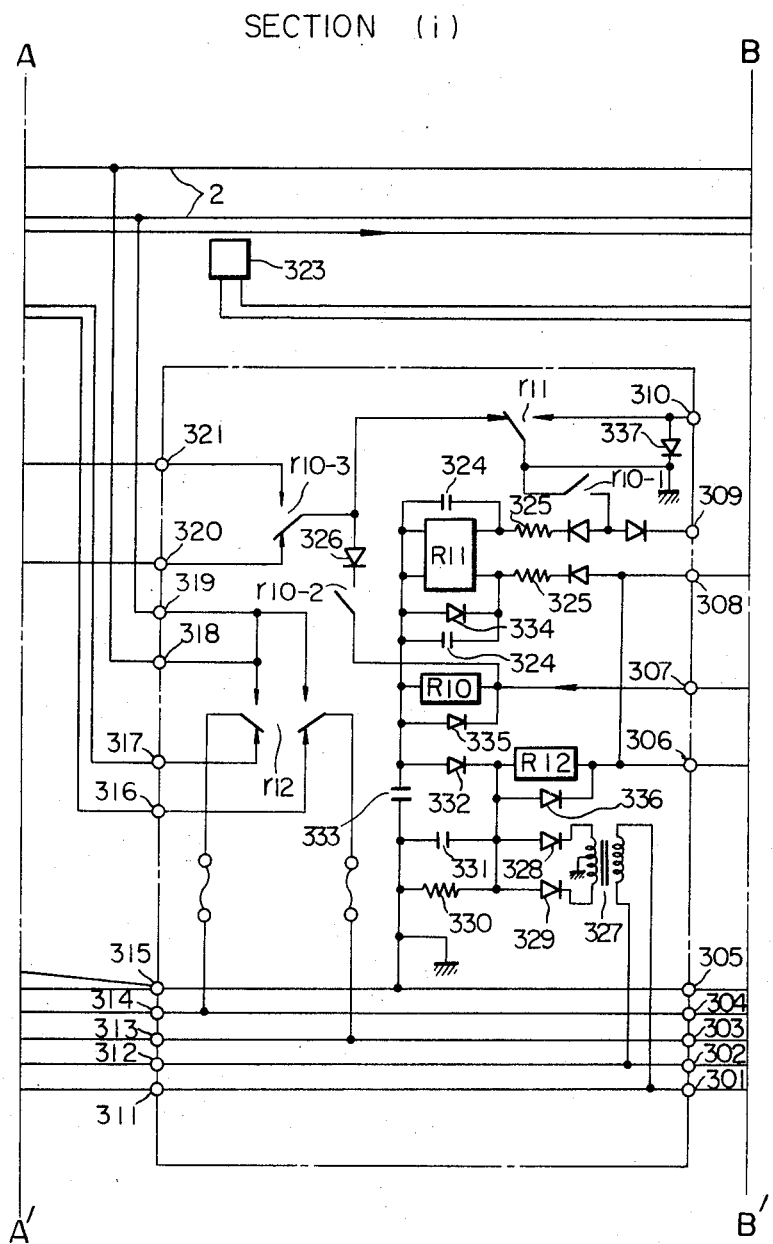

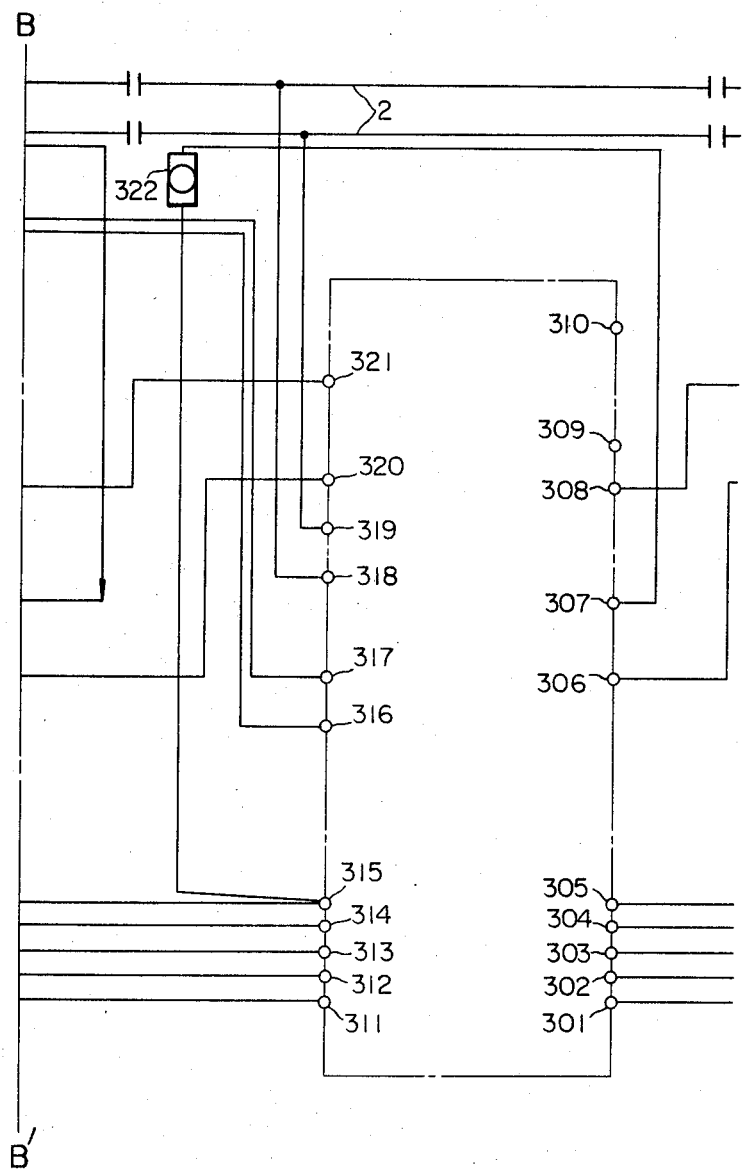
Fig. 2A-(3)
SECTION (i+1)

BRANCHING AND JOINING APPARATUS IN AUTOMATIC CARRYING SYSTEM

RELATED APPLICATION

This application is a division of Ser. No. 769,320, filed Oct. 21, 1968 now U.S. Pat. No. 3,646,613.

FIELD OF THE INVENTION

This invention relates to a branching and joining apparatus for executing selectively a branching or a joining operation to change the direction of movement of an electromotive carrier running on a rail provided with a power supply line.

DESCRIPTION OF THE PRIOR ART

In order to fully automize a carrying or conveying system, it has been proposed to provide a rail with a power supply line, to dispose on the rail electromotive carriers used for conveying loads, each of said electromotive carriers including an electric collector, a motor, various controllers, etc. therein, and to permit such electromotive carriers to run on the rail by applying driving power and control signals from the power supply line to the carriers. In realizing such system, it is desired to employ not only a main rail but also sub-rails which are branched from the main rail so that the electromotive carriers can travel along various routines.

There has been an increasing demand for an improved branching and joining apparatus to be used at a branching location where a sub-rail joins a main rail, which can perform automatically and efficiently a branching operation by which an electromotive carrier running on the main rail is transferred onto the sub-rail, or a joining operation by which the electromotive carrier running on the sub-rail is transferred onto the main rail.

SUMMARY OF THE INVENTION

In accordance with the invention, there is provided a branching and joining apparatus for use in an automatic carrying system including a main rail and at least one sub-rail each provided with a power supply line and further having an electromotive carrier adapted to run on said rails, said apparatus disposed at a location where said main rail and sub-rail join together and comprising a pair of integrally movable rails fixed to a motor of reversible type which in turn is fitted on a threaded shaft attached to a machine frame through a coil spring, said motor being adapted, when rotated in either direction, to move along the threaded shaft together with the movable rails while the threaded shaft is not moved relative to the machine frame and thereafter to compress or stretch the coil spring while the threaded shaft is moved, so that the movable rails are positioned in either of a "straight-forward" and "branching and joining" positions with the coil spring substantially compressed or stretched. Thus, the movable rails are locked positively in the reached position.

The branching and joining apparatus according to the invention can be applied to an automatic carrying system of the type having a rail provided with a power supply line contained therein, said rail being preferably divided in a plurality of sections each having a segment of power supply line, each of such rail sections being associated with a section control unit which controls the cut-off of electric power to the power supply line of that rail section as desired.

The invention will be described further by way of example, with reference to the drawings, in which:

FIG. 2A is a schematic diagram of section control circuits which control cut-off of electric power to respective rail sections.

DESCRIPTION OF THE PREFERRED EMBODIMENTS

Figure 1A:
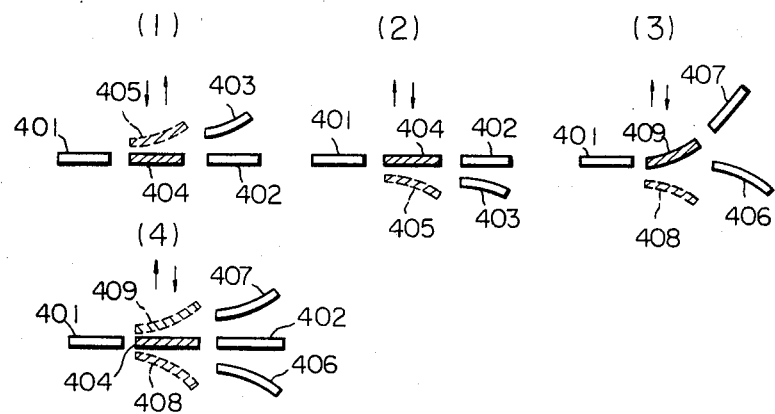
FIG. 1A is a view showing the types of branching operations in accordance with the invention.

Referring to FIG. 1A, types of branching operation of the rail are shown: Numeral (1) designates lefthand branching, (2) designates righthand branching, (3) designates Y-type branching, and (4) designates three-way branching.

In FIG. 1A, rails 401, 402, 403, 406 and 407 are fixed, rails 404, 405, 408 and 409 are movable, and the rails 404 and 405 (in the cases of the lefthand and right-hand branchings), the rails 408 and 409 (in the case of the Y-type branching), and the rails 404, 408 and 409 are arranged to move integrally in the direction perpendicular to the direction of the rails 401 and 402, respectively.

Only the lefthand branching will be described in detail, since other branching operations are similar.

Figure 1B:
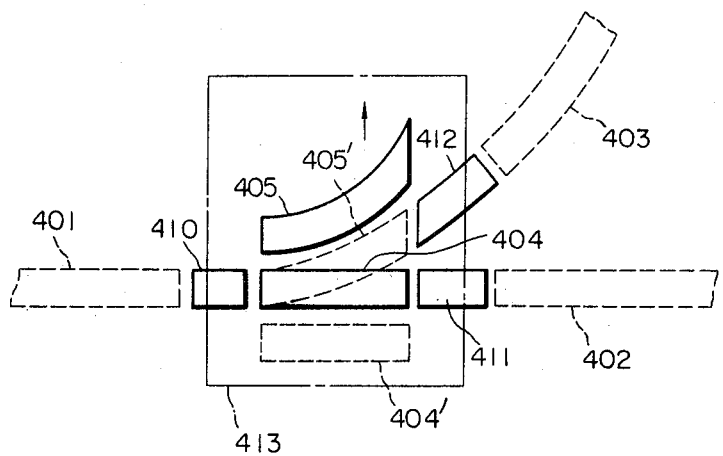
FIG. 1B shows the principle of the lefthand branching operation.

Referring to FIG. 1B, the principle of the lefthand branching operation is shown.

The lefthand branching apparatus includes fixed rails 401, 402, 403, movable rails 404, 405, and auxiliary fixed rails 410, 411, 412 which provide smooth running of an electromotive carrier in the branching operation. The auxiliary fixed rails 410, 411 and 412 and the movable rails 404, 405 form an integral unit of the branching apparatus in which the movable rails 404, 405 are interconnected so that they can move together. In order to execute lefthand branching of the carrier, the movable rails 404, 405 are displaced to the position designated by numerals 404', 405' as will be described hereinafter. The rail means comprising the fixed rails 401, 402 will be referred to as a main rail, and the rail means comprising the fixed rail 403 and its extension will be referred to as a sub-rail. Thus, by displacing the movable rails, a branching operation from the main rail to the sub-rail or a joining operation from the sub-rail to the main rail will be effected according to the direction of displacement of the movable rails.

Referring to FIGS. 1C-1 to 1C-3, there is shown a structure of one example of the branching apparatus.

A drive motor M2 includes a stator and a rotor (not shown) in which a threaded shaft 415 is intermeshed. When the motor M2 rotates, the movable rails 404, 405 together with the motor M2 move perpendicularly to the rails 410 and 411. More particularly, one end of the shaft 415 is fixed through a coil spring 416 to a machine frame 413, and the movable rails 404, 405 are adapted to be moved perpendicularly to the main rail together with the motor M2. When the motor M2 is energized, its rotor rotates so that it moves on the shaft 415 and the movable rails 404, 405 move integrally therewith. The shaft 415 is preferably protected from dust by a member such as bellows 417. Thus, rotation of the rotor is converted to a linear motion easily and simply.

Figures 1, 1C:
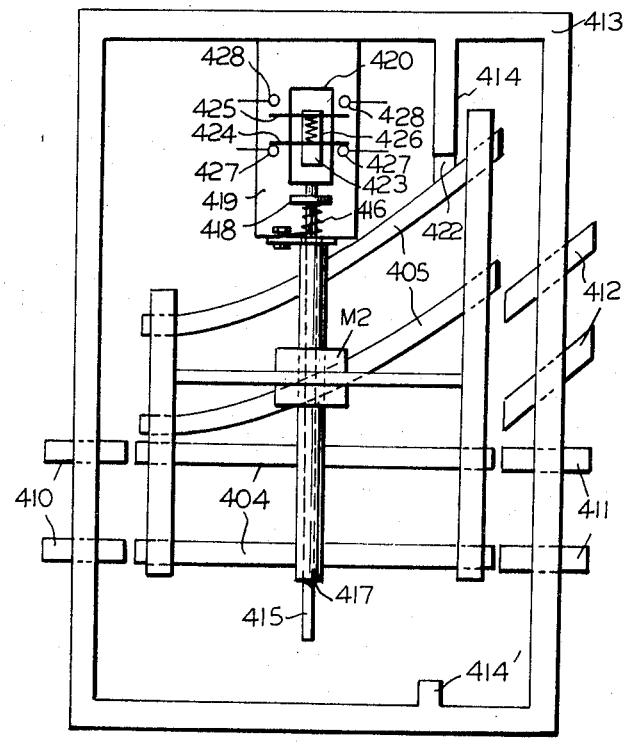
FIGS. 1C-1, 1C-2 and 1C-3 are plan views of the branching and joining apparatus showing the straight-forward, intermediate and branching positions, respectively.
Figures 1, 1C, 2:
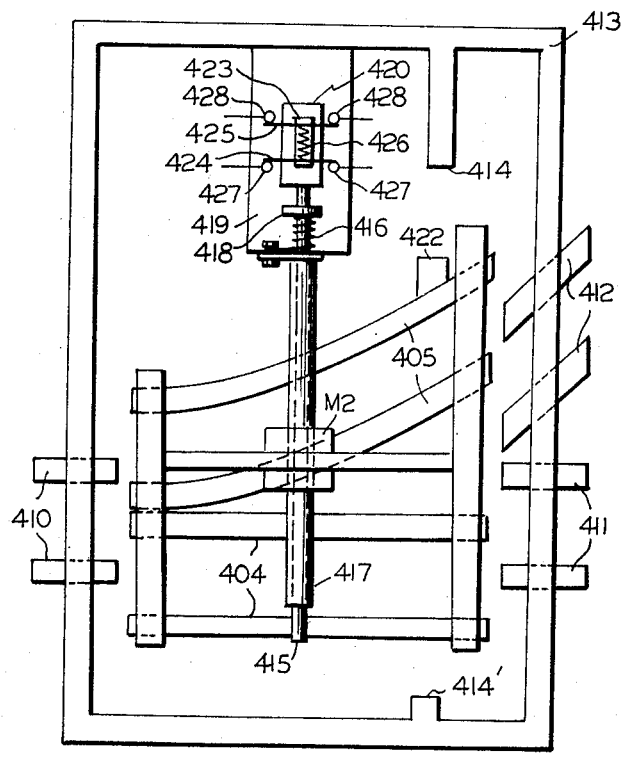
Figures 1, 1C, 2, 3:
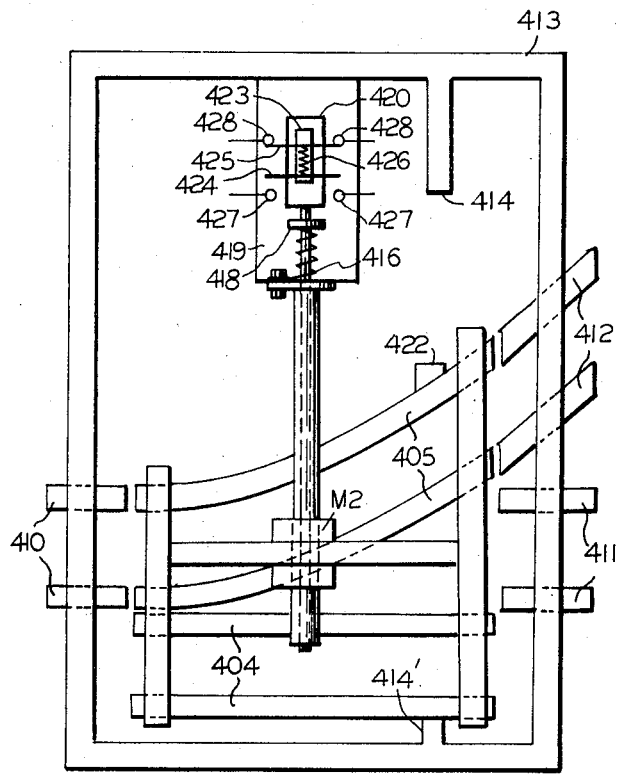

The coil spring 416 engaged between a washer 418 secured to the end of the shaft 415 and a casing 419 secured to the frame 413. As mentioned above, the motor M2 can move on the shaft 415, on the other hand, the shaft 415 per se is adapted to be moved lengthwise within a limited range when a predetermined condition is established. That is, the coil spring 416 is adapted to have its free length when the movable rails 404, 405 are in an intermediate position, shown in FIG. 1C-2, between a "straight-forward position" shown in FIG. 1C-1, in which the carrier is moved straightforwardly through the branching apparatus and a "branching position" shown in FIG. 1C-3, in which branching of the carrier is executed. When the movable rail 404 is to be positioned in the straight-forward position as shown in FIG. 1C-1, the motor M2 moves upward along the shaft 415 together with the movable rails 404, 405 until stopper means 414 provided on the machine frame 413 contacts stopper member 422 located on the upper end of rail 405. Meanwhile, the shaft 415 is not moved relative to the machine frame. During further rotation of the motor M2, the movable rails 404, 405 can no longer move on the shaft 415 because of the engagement of said stoppers so that the shaft 415 is moved downward while compressing the spring 416, whereby the movable rail 404 is engaged positively by the auxiliary fixed rails 410, 411 with the spring 416 substantially compressed. On the contrary, when the movable rail 405 is to be positioned in the branching position, the motor M2 moves downward along the shaft 415 together with the movable rails 404, 405 until the lower ends of the movable rail 404 contact the stopper member 414' as shown in FIG. 1C-3. Meanwhile the shaft 415 is not moved relative to the machine frame. When the motor M2 is rotated further, the shaft 415 is moved upward while stretching the spring 416, whereby the movable rail 405 is engaged positively by the auxiliary fixed rails 410, 411 with the spring 416 substantially stretched or tensioned.

A branching position detector 420 detects the present position (straight-forward, branch, or intermediate positions) of the movable rails from the position of the shaft 415.

Figure 1D:
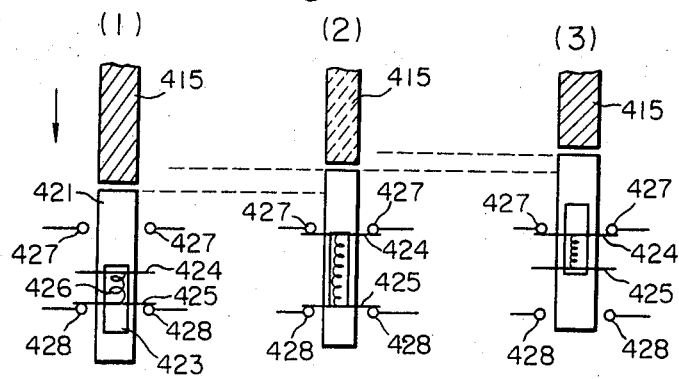
FIG. 1D shows the principle of the operation of a position detector of the branching apparatus.

Referring now to FIG. 1D, the principle of the operation of the detector 420 is shown. The detector 420 has a structure which detects the three positions by means of one limit switch. One end of the shaft 415 is engaged with a lever 421 of the limit switch, which lever has a groove 423 therein. Contacting plates 424, 425 are provided so that they can move freely within the groove 423 along the axis of the lever. The axial length of the groove 423 is selected to be not smaller than the distance between the contacting members 427 and 428. A spring 426 is provided between the plates 424 and 425. Contacting members 427, 428 are provided at both sides of the contacting plates so that the members can respectively be closed electrically by means of the plates 424, 425 in accordance with the axial position of the lever 421. More particularly, when the movable rails 404, 405 are in the branching position, the spring 426 is in its compressed condition with only the contacting member 428 closed by the plate 425 as shown in FIG. 1D(1), when the movable rails are in the intermediate position, the spring 426 assumes its free length with both the contacting members 427 and 428 closed respectively by the plates 424 and 425 as shown in FIG. 1D(2), and when the movable rails are in the straight-forward position, the spring 426 is in its compressed condition with only the contacting member 427 closed by the plate 424 as shown in FIG. 1D(3). By employing this type of limit switch, only one limit switch is required for detecting three positions of the movable rails.

As aforementioned, each rail has a power supply line contained therein. Each electromotive carrier is supplied with electric power and control signals from the power supply line, thereby the electromotive carrier is permitted to travel along the rail by rotating a motor contained in the carrier. Each one of the movable rails 404, 405, 408, 409 and the auxiliary fixed rails 410, 411, 412 has a segment of power supply line, and each of the extensions of the fixed rails 401, 402, 403, 406 and 407 is preferably divided in a plurality of rail sections each associated with a section control circuit which controls cut-off of supply of electric power to the power supply line segment of that rail section as desired.

Therefore, before proceeding to the description of the branching control circuit for controlling the supply of electric power to the power supply line segments of the branching and joining apparatus, the construction and operation of the section control circuit will be described in conjunction with FIGS. 2A and 2B.

In FIG. 2A, although one section control circuit comprises a portion designated as the section (i), for example, for convenience of explanation, the construction and operation of the section control circuit will be described in a state that the section (i+1) and the section (i−1) each having a section control circuit of the same construction as that of the section (i) are connected immediately before and after it.

A terminal 320 of the section control circuit of the section (i) is connected to a terminal 306 of the section control circuit of the section (i−1) to which in turn a relay R12 of the section control circuit of the section (i−1) is connected. The connection between the section control circuits of the section (i) and the section (i+1) is the same as that between the section (i−1) and the section (i).

A movable contact $r11$ of a relay R11 is closed at its left side as seen in FIG. 2A. When the electromotive carrier enters into the section (i), a detector 322 of the carrier (i) detects the entrance of the electromotive carrier into the section (i) and sends a detected signal to a relay R10. The relay R10 is energized to close its movable contact $r10-1$ and the upper side of the relay R11 is grounded, whereby its movable contact $r11$ is closed to its right side in FIG. 2A. The terminal 320 of the section control circuit of the section (i), is, until the relay R10 is energized, grounded through the lower side contact of its movable contact r10-3 and the left side contact of the movable contact r11 of the relay R11. Thus, since the relay R12 of the section (i−1) is energized with its one end grounded, its movable contact r12 is closed at the side (upper side) opposite to that shown in FIG. 2A with respect to the corresponding movable contact r12 of the section (i), the driving power being supplied to the power supply line 2 from power supply terminals 303 and 304. When the relay R10 is energized as described above, its movable contact r10-3 is closed at the side (upper side) opposite to that shown in the drawing and its movable contact r11 is also closed at its right side. Thus, the relay R12 of the section (i−1) is disconnected from the ground, and the contact r12 is switched to the position (lower) as shown in the drawing, thereby the power supply to the power supply line of the section (i−1) being cut off.

A capacitor 324 and a resistor 325 are connected to the relay R11 and the energization thereof is delayed a period determined by the time constant of the capacitance and the resistance after the energization of the relay R10. This time delay may be adjusted by changing either the capacitance of the capacitor 324 or the resistance of the resistor 325. However, the change of the resistance of the resistor 325 will result in the change of the current flowing through the relay R11, thus the capacitance of the capacitor being preferably changed. By providing a delay between the energization of the relay R10 and that of the relay R11, even if the movable contact r10-3 is closed at the side (upper side) opposite to that shown in FIG. 2A, the movable contact is kept to be closed at its left side as shown in FIG. 2A and a terminal 321 of the section (i) is grounded, thus the current flowing through the lower side of the relay R11 of the section (i−1), and its movable contact r11 being kept to be closed at its left side as shown in FIG. 2A.

In FIG. 2A are shown the timing relationship of the main waveforms in the section control circuit. The waveform (1) represents a detecting time of the detector 322, the waveform (2) represents a detected signal at the terminal 307, the waveform (3) represents that at the terminal 309, the waveform (4) represents examples of the potential change at the terminal 320 (negative going) and the state of transition of the movable contact r11 (positive going), and the waveform (5) represents that at the terminal 321.

Figure 2B:
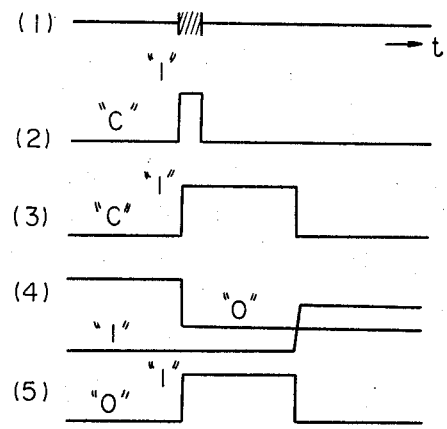
FIG. 2B shows various waveforms appearing at various points of the circuit of FIG. 2A.

When the electromotive carrier runs from the section (i) into the section (i+1), the power to the supply line of the section (i) is cut off by virtue of the operation of the section control circuit of the section (i+1), a signal similar to the waveform (5) of FIG. 2B is sent to the terminal 308 of the section (i) from the terminal 321 of the section control circuit of the section (i+1), the lower side of the relay R11 of the section (i) is grounded to close its movable contact r11 at its left side, the relay R12 is grounded from the terminal 320 through the terminal 306 of the section control circuit of the section (i−1) to allow the relay R12 to be energized and the movable contact r12 of the section (i−1) to be switched to the upper side position, thereby supplying power to the power supply line of the section.

While the electromotive carrier is running within the range detectable by the detector 322 and the relay R10 of the section control circuit is energized, a ground level signal appears at the terminal 309. This signal may be used as a signal indicating that the electromotive carrier has entered into the section in question. Also, while the movable contact r11 of the relay R11 is closed at its right side, a ground level signal appears at the terminal 310. This ground signal may be used as a signal indicating that the electromotive carrier is present in that section.

When the period during which the detector 322 detects the electromotive carrier running at a high speed by energizing the relay R10 is shorter than the delay time of the relay R11, it may happen that the power to the power supply line in the immediately succeeding section will not be cut off after the carrier has entered into the present section. In order to prevent this, a contact r10-2 of the relay R10 and a diode 326 are provided so as to self-hold the relay R10. More particularly, the diode 326 prevents the terminal 320 from being grounded by the movable contact r10-2 even after the movable contact r11 has been switched to close at its right side in FIG. 2A.

Further, the diode 326 cuts off the current flowing through the winding of the relay R10 so that it prevents its surge from affecting the movable contact r11.

A D.C. power supply including a transformer 327, rectifying diodes 328 and 329, a resistor 330 and a smoothing capacitor 331 is provided so as to provide the power to energize each of the relays for operation. A power supply for the relays R10 and R11 is composed of a capacitor 333 having one end grounded and the other end connected to said D.C. power supply through a diode 332. The capacitance of the capacitor 33 is preferably selected so that the electric charge on it is sufficient to energize the relays R10 and R11. Now, let us suppose that either the regulated power supply alone (at terminals 301 and 302) or both the regulated power supply and the main power supply (at terminals 303 and 304) fail. It may happen that the electromotive carrier running in the section (i−1) can not stop simultaneously with the occurrence of the failure, so that because of its inertia it runs into the section (i), thereby causing the detector to be operated. In this case, the electric charge on the capacitor 333 is not discharged through the winding of the relay R12 due to the presence of the diode 332, even if the regulated power supply of the section control circuit of the section (i) fails. Therefore, when the detector 322 is activated, the electric charge on the capacitor 333 energizes the relays R10 and R11 so that the terminal 320 of the section (i) is disconnected from the ground. Thus, since the movable contact r12 of the section (i−1) is switched to its lower position and the power to the power supply line of the succeeding section (i−1) is cut off, the relay R12 of the section (i−1) is not energized unless the relay R11 of the section (i) is energized, even if the power is supplied again, and, consequently the power is kept not to be supplied to the power supply line. The capacitance of the capacitor 333 is sufficient to energize the relays R10 and R11 at least once. Therefore, the power to the power supply line of the succeeding section is assuredly cut off for at least one time of operation of the detector even after the failure of the power supply.

When the power is not supplied to the power supply line in the section control circuit of the section (i), the movable contact r12 of the relay R12 is closed at its lower position so that the power is supplied to terminals 316 and 317 of the section (i). Therefore, if a low speed instruction device 323 for the electromotive carrier is provided at the entrance whereat it runs into the section (i−1), and if such instruction device 323 is connected to the terminals 316 and 317, the low speed instruction device 323 can be used to reduce the speed of the succeeding electromotive carrier soon after it has entered into the section (i−1) so that it may be stopped smoothly with less shock when it has entered into the section (i) in which the power to the power supply line is interrupted.

In FIG. 2A, diodes 334, 335, 336 and 337 are used as surge absorbers.

Now, returning to the description of the branching and joining apparatus per se, and the circuit for controlling the supply of electric power to the power supply lines thereof will be described.

Figure 3A:
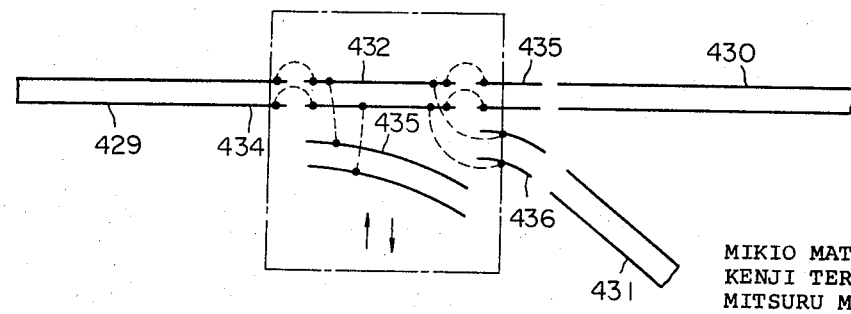
FIG. 3A is a wiring diagram for the rails of the branching and joining apparatus.

Referring now to FIG. 3A, a schematic diagram of a power connection to the branching apparatus is shown.

The fixed rails have power supply lines 429, 430 and 431, respectively. The movable rails have power supply lines 432, 435, respectively, and the auxiliary fixed rails have power supply lines 434, 435 and 436, respectively. These power supply lines are electrically connected as shown by broken lines.

Figure 3B:
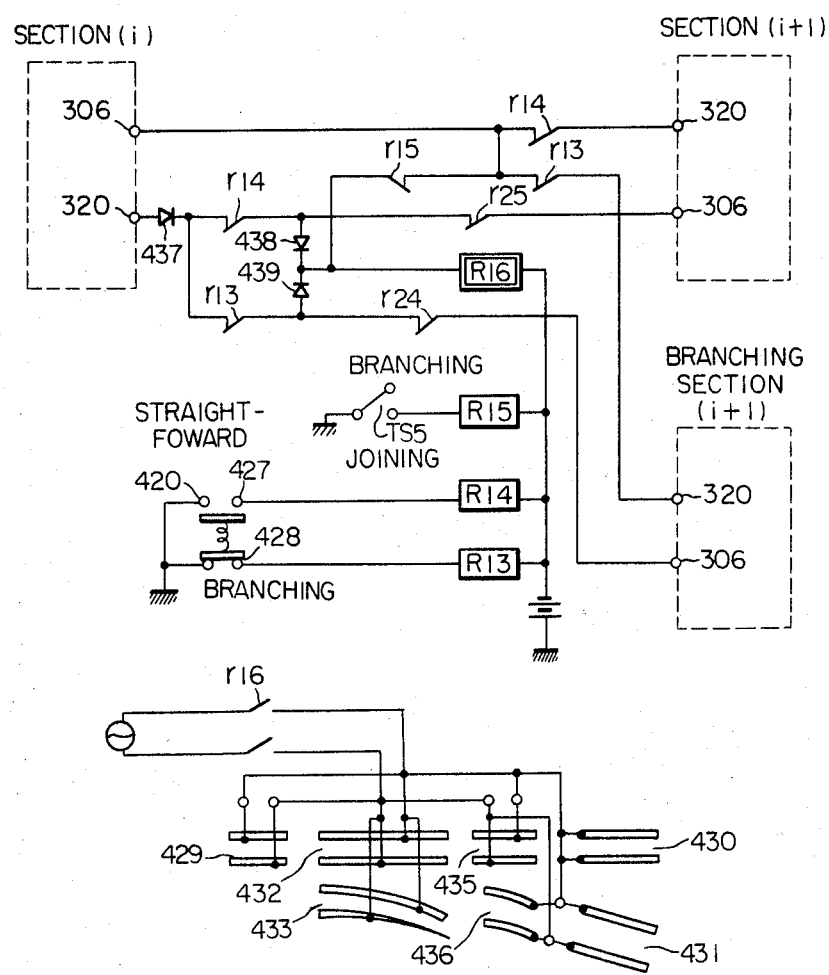
FIG. 3B shows a schematic diagram of a branching control circuit for controlling the supple of electric power to the power supply line segments of the branching and joining apparatus.

FIG. 3B shows a branching control circuit for controlling the supply of electric power to the supply lines of the sections (i), (i+1), and of the branching section (i+1). Blocks designated by broken lines show the section control circuits of the sections (i), (i+1) and the branching section (i+1), each of which has the same construction as those shown in FIG. 2A, and only the terminals 306 and 320 are shown for explanatory purpose.

When a branching or joining transfer switch TS5 is opened (branching side) as shown in FIG. 3B, a relay R15 is deenergized to close its contact r15. The terminals 320 of the respective section control circuits of the section (i+1) and the branching section (i+1) are connected respectively through the contact r14, r12 of relays R14, R13 to the terminal 306 of the section control circuit of the section (i). Also, the terminals 320 are connected to the relay R16 through the contact r15 of the relay R15. As described previously in conjunction with FIG. 2A, the terminal 306 of the section (i) is grounded when the electromotive carrier is not present in either of the section (i+1) and the branching section (i+1). When the electromotive carrier enters into the section (i), power is supplied to the supply line of the section (i) and the relays R16 is grounded through the contact r12 of the relay R15, so that the contact r16 is closed to supply electric power to the supply lines of the rails of the branching apparatus on the condition that either the contact r14 or the contact r13 is closed, that is, the rails of the branching apparatus are in the straight-forward position so that the contacting member 427 of the position detector 420 is closed to energize the relay R14, or in the branching position so that the contacting member 428 is closed to energize the relay R13. Thus, if the movable rails of the branching apparatus have not been transferred completely, electric power is not supplied to the power supply line, and hence the electromotive carrier will never collide against the movable rails.

When the switch TS5 is switched to "joining position", i.e., it is closed, one end of the relay R15 is grounded so that it is energized to open its contact r15 thereby the branching circuit opens. The joining operation may be carried out easily by causing the electromotive carrier to run through the branching apparatus in the opposite direction to that in which the electromotive carrier runs during branching operation. The relay R16 is energized from the terminal 320 of the section (i) through a diode 437, one of the contacts r14 or r13, and one of the diodes 438 or 439 respectively so that its contact r16 closes thereby the power is supplied to the supply lines 2 of all of the rails of the branching and joining apparatus. As aforementioned in conjunction with FIG. 2A, the ground level signal appearing at the terminal 320 of the section control circuit of the section (i) is passed through the diode 437. Thence, the ground signal is sent either to the terminal 306 of the section control circuit of the section (i+1) through a contact r25 of a relay R25 to supply electric power to the supply line of the section (i+1) when the movable rails are in the straight-forward position, or to the terminal 306 of the section control circuit of the branching section (i+1) through the contact r13 of the relay R13 to supply electric power to the supply line of the branching section (i+1) when the movable rails are in the branching position. Thus, if the movable rails have not been transferred completely, power is not supplied to the supply line, whereby it is assured that the electromotive carrier never collides against the movable rails.

Figure 3C:
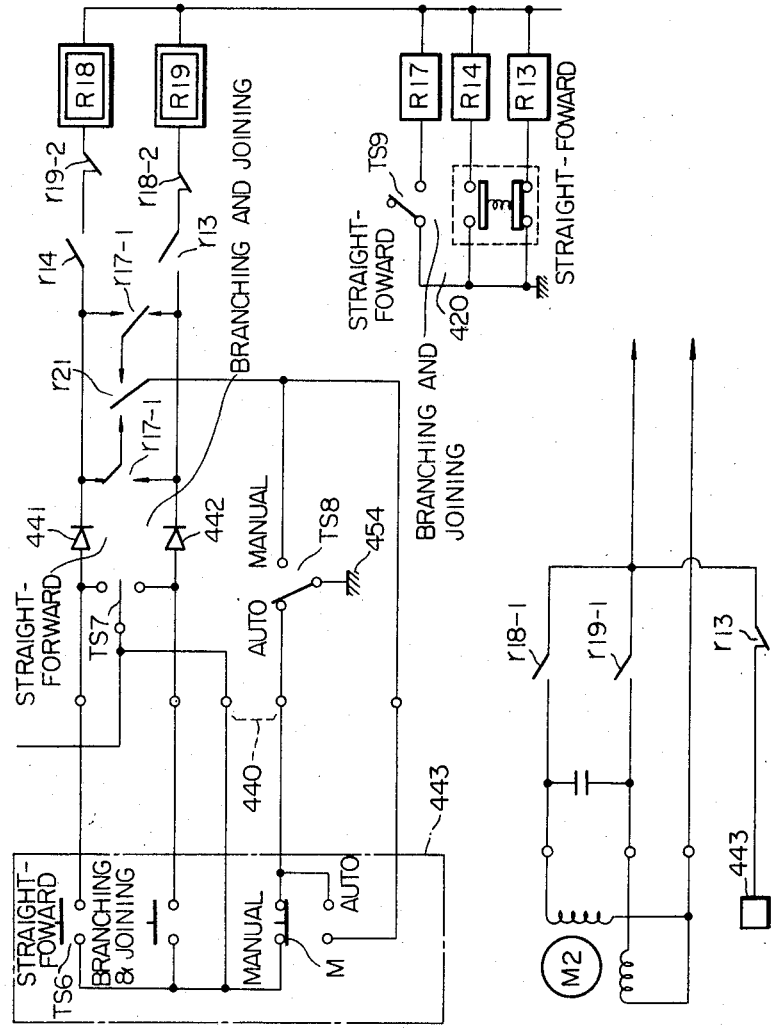
FIG. 3C is a schematic diagram of a circuit for controlling transfer of a movable rail of the branching and joining apparatus. And, FIG. 3D is a schematic diagram of a movable rail control circuit.

Referring to FIG. 3C, it shows a schematic electric wiring diagram of a movable rail transfer circuit.

A motor M2 is preferably reversible. The motor M2 is supplied with electric power from the power supply lines 2, and drives the movable rails through the threaded shaft 415 as described previously.

When a relay R18 as described later is energized to close its contact r18-1, the movable rails are transferred to the straight-forward position, on the other hand, when a relay R19 as described later is energized to close its contact r19-1, the movable rails are transferred to the branching (or joining) position.

When the motor M2 rotates so as to drive the movable rails to the straight-forward position (or branching position), the position detector 420 is operated to deenergize the relay R14 (or R13) thereby its contact r14 (or r13) opens so that the relay R18 (or R19) is deenergized to open its contact r18 (or r19). Thus, the motor M2 stops rotation to the straight-forward position (or branching position). In this position the relay R18 (or R19) is interlocked so that it is not energized further. Thus, the relay R14 (or R13) and its contact r14 (or r13) are connected in series so that the relay R18 can be energized only when the movable rails are moved to the branching (or straight-forward) position, as seen in FIG. 3C.

In order to automatically operate the movable rail transfer circuit, a switch TS8 must be closed at its right side and a remote control switch TS6 must be closed at its "automatic" contact or when the remote switch TS6 is disconnected a jumper 440 must be inserted. A switch TS9 is used for switching the movable rails to either the straight-forward or branching positions.

When this switch TS9 is closed at its lower side (branching and joining position), the relay R17 is energized so that its lefthand contact r17-1 is closed at its lower side (left side). The righthand contact r17-1 thereof is operated in the opposite manner to the operation of the left-hand contact r17-1.

When a relay R21 is energized as will be described hereinafter to close its contact r21 at its right side, the relay R19 is energized through the righthand contact r17-1 of the relay R17, contacts r13 and r18-1 to close its contact r19-1 thereby the motor M2 is rotated so that the movable rails are moved toward the branching position. Thereafter, when the contact r21 returns to its original position (left side), the relay R18 is energized through the lefthand contact r17-1 of the relay R17, contacts r14 and r19-2 to close its contact r-1 thereby the motor M2 is rotated so that the movable rails are moved toward the straight-forward position. Thus, the movable rails return to the original straight-forward position.

In manual operation of the transfer circuit, when the remote switch TS6 is not used, the jumper 440 is inserted, the switch TS8 is switched to "manual" (closed at its right side), a switch TS7 is switched to either the straight-forward (upper side) or branching and joining (lower side) positions. In the case when the switch TS7 is switched to the straight-forward position, the relay R18 is energized through a diode 441, the contacts r14, r19-2, and in the case when the switch TS7 is switched to the branching and joining position, the relay R19 is energized through a diode 442, the contacts r13, r18-2 so that the motor M2 is rotated in the required direction. When the remote control switch TS6 is used, the jumper 440 is disconnected, the switch TS8 is set in the "manual" position, the switch TS6 is set in the condition shown in FIG. 3C (i.e. the contact MANUAL is closed) and either the push bottom STRAIGHT-FORWARD or BRANCHING or JOINING is depressed, and as a result the motor M2 is rotated in the required direction, similar to the case of the switch TS7.

The contacts r18-2 and r19-2 are linked so as not to close simultaneously for safety.

Figure 3D:
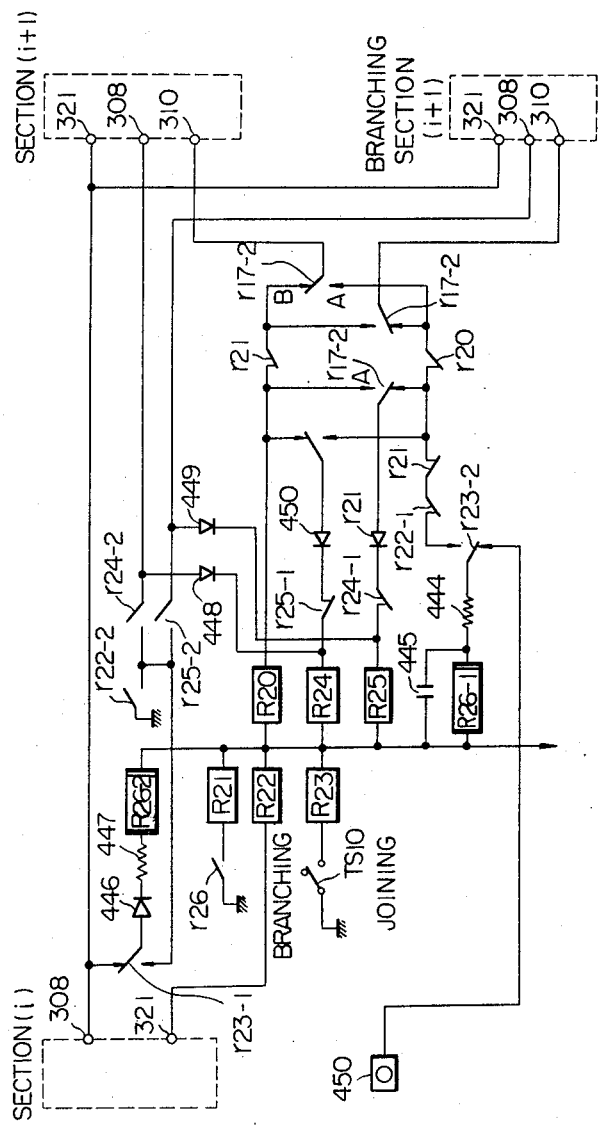

Referring now to FIG. 3D, it shows a schematic diagram of a movable rail control circuit. A switch TS10 is used for effecting switching between branching and joining modes. A detector 451 receives either a branching or joining instruction from an instruction device 450.

When the switch TS10 is in the branching position and a branching instruction is detected at the detector 451, a ground level signal is generated at the detector 451 so that the relay R26-1 is energized through the contact r23-2 of the relay R23 and a resistor 444 to close its contact r26. Thus, the relay R21 is energized to close its contact r21 (FIG. 3C) at its right side (branching position) whereby the movable rails are moved toward the branching position as described hereinbefore. The relay R23 is not energized when the switch TS10 is opened, i.e., it is in the BRANCH position. Thus, the contacts r23-1 and r23-2 maintain their positions shown in FIG. 3D. The relay R26-1 is interlocked and keeps its interlocked state unless it receives a different instruction, so that even if the power is shut off, the operation of the electromotive carrier is not blocked.

The resistor 444 and a capacitor 445 are used for delaying the energization of the relay R26 for a predetermined period.

In operation of this circuit, when the electromotive carrier has passed over the branching and joining apparatus and enters into the branching section (i+1), a ground level signal provided at the terminal 321 of the section control circuit of the branching section (i+1) is passed into the movable rail control circuit. This ground signal is applied to the terminal 308 of the section control circuit of the section (i). Simultaneously, the relay R26-2 is energized by the ground signal through the contact r23-1, a diode 446 and a resistor 447 to open its contact r26, thereby the relay R21 is deenergized to return its contact r21 (FIG. 3C) to the original straight-forward position. Thus, the movable rails are returned to the original straight-forward position. A diode 446 is provided for preventing counterflow of current, and a resistor 447 is provided as a voltage divider.

When the switch TS10 is switched to the JOINING position, the relay R23 is energized so that its contact r23-1, r23-2 are switched to the positions opposite to those shown in FIG. 3D.

While the switch TS9 in FIG. 3C is switched to the STRAIGHT-FORWARD position, the relay R17 is not energized so that its contacts 17-2 are in the positions shown in FIG. 3D. When the electromotive carrier runs into the branching section (i+1), the terminal 310 is grounded so that the relay R26-1 is energized through the contact r17-2 (the rightmost and lowermost one in FIG. 3D), a contact r20 of a relay R20, a contact r21 of a relay R21, a contact r22-1 of a relay R22 and a resistor 444 whereby its contact r26 is closed. Thus, the relay R21 is energized so that its contact r21 shown in FIG. 3C is switched to the BRANCHING position. Then the movable rails are moved to the branching position so that the electromotive carrier can pass the branching and joining apparatus into the section (i). Even if the following electromotive carrier runs into the section (i+1) while the preceding electromotive carrier from the branching section (i+1) is approaching the section (i) so that the terminal 310 is grounded, the relay R20 is not energized since the relay R21 is energized to open its contact r21 (FIG. 3C). Thus, its contact r21 is kept closed so that the relay R21 is not affected thereby the movable rails are kept in the branching position. When the electromotive carriers passes over the branching and joining apparatus into the section (i), the terminal 321 of the section control circuit of the section (i) is grounded so that the relay R22 is energized thereby its contact r22-2 is closed to energize the relay R26-2 and its contact r22-1 is opened to deenergize the relay R26-1. Thus, the relays R26-1 and R26-2 are prevented from being energized simultaneously.

When the switch TS9 is positioned in the JOINING position (closed in FIG. 3C), the relay R17 is energized so that its contacts are switched to the positions opposite to those shown in FIG. 3D. When the electromotive carrier runs into the section (i+1), the terminal 310 of the section control circuit of the section (i+1) is grounded so that the relay R26-1 is energized through the contact r17-2 (the rightmost and uppermost one in FIG. 3D) similarly to the case when the electromotive carrier runs into the branching section (i+1) thereby its contact r26 closes. Thus, the relay R21 is energized so that its contact r21 shown in FIG. 3C is switched to the straight-forward position. Then the movable rails are moved to the straight-forward position and the electromotive carrier moves over the branching and joining apparatus into the section (i). Even if the following electromotive carrier runs into the branching section (i+1) while the preceding electromotive carrier is on the way to the section (i), the relay R20 is not energized, the relay R21 is not affected and the movable rails are kept in the straight-forward position similar to the case when the electromotive carrier moves into the section (i+1).

When the electromotive carrier runs into the section (i+1) while the switch TS9 is in the straight-forward position, the terminal 310 of the section control circuit of the section (i+1) is grounded, on the other hand, the relay R17 shown in FIG. 3C is kept deenergized so that its contact r17-2 is positioned in the position shown in FIG. 3D thereby the relay R20 is energized through the contact r21 of the relay R21 to open its contact r20. Thus, the relay R26-1 is not energized and hence the relay R21 is not energized thereby the movable rails are kept in the straight-forward position so as to allow the electromotive carrier to pass over it. When the electromotive carrier runs into the joining section (i+1) while the switch TS9 is in the JOINING position, the terminal 310 of the section control circuit (i+1) of the joining section (i+1) is grounded and the relay R17 is energized, and as a result its contact r17-2 is switched to the position opposite to that shown in FIG. 3D and the movable rails are kept in joining position similar to the case when the electromotive carrier runs into the section (i+1). Thus, the electromotive carrier passes over the branching and joining apparatus.

When the electromotive carrier runs into the section (i) after it has been joined by the branching and joining apparatus, a ground level signal from the terminal 321 of the section control circuit of the section (i) energizes the relay R22 to close its contact r22. Since the switch TS10 is in the joining position, the relay R23 is energized so that its contact r23-1 is closed in a position opposite to that shown in FIG. 3D thereby the relay R26-2 is energized through the contact r23-1, a diode 446, and a resistor 447 and the contact r26 opens. Thus, the relay R21 is deenergized so that its contact r21 is returned to the original lefthand position, thereby the movable rails which have moved to the joining position return to the original position. When the electromotive carrier passes over the branching and joining apparatus under the condition that the movable rails have not moved, the relay R26-2 is energized but its contact r26 is kept closed so that the relay R21 is kept energized and the movable rails remain stationary.

When the switch TS9 shown in FIG. 3C is in the straight-forward position, if the electromotive carrier moves from the section (i+1) into the section (i), the terminal 321 of the section control circuit of the section (i) is grounded. The ground level signal from the terminal 310 of the section (i+1) energizes the relay R20, and simultaneously the relay R24 is energized through one of the contacts r17-2 (the lefthand one in FIG. 3D), a diode 450 and a contact r25-1 of a relay R25 so that its contact r24-1 is closed. In this state, even if the electromotive carrier runs into the branching section (i+1) so that the terminal 310 of the section control circuit of the branching section (i+1) is grounded, the relays R26-1 and R25 are not energized since the contact r20 is opened.

However, when the electromotive carrier enters into the section (i) while the contact r24-1 is closed, the relay R22 is energized by the ground level signal from the terminal 321 of the section control circuit of the section (i) to close its contact r22-2, the terminal 308 of the section (i+1) is grounded only while the contact r22-2 is closed since the contact r24-1 is closed as previously described. A diode 448 permits the relay R24 to self-hold while the contact r22-2 is closed. When the terminal 308 of the section control circuit of the section (i+1) is grounded, the terminal 310 is disconnected from the ground so that the relay R20 is deenergized to close its contact r20. Accordingly, when the electromotive carrier is in the branching section (i+1), since its terminal 310 is grounded so that the relay R25 is energized to close its contact r25-2, the terminal 308 of the branching section (i+1) is grounded thereby the relay R24 is self-held until the contact r22-2 opens. Then its contact r24-1 is opened and the relay R25 is deenergized so that its contact r25-2 is opened whereby the terminal 308 of the section control circuit of the branching section (i+1) is prevented from being grounded.

When the electromotive carrier moves from the branching section (i+1) into the section (i), the relay R25 is energized by the ground level signal from the terminal 310 of the branching section (i+1) to close its contact r25-2 similarly to the case when the electromotive carrier moves from the section (i+1) into the section (i). Since the contact r22-2 is in its closed state, the terminal 308 of the section control circuit of the branching section (i+1) is grounded.

When the electromotive carrier is in the section (i+1) so that the terminal 310 of the section control circuit of the section (i+1) is grounded, the relays R20 and R24 are not energized since the contact r21 is opened.

When the switch TS9 of FIG. 3C is in the joining position, since the contact r17-2 is switched to the position opposite to that shown in FIG. 3D, the contacts r21, r20 are switched to the interchanged positions in the circuit in comparison to the case when the switch TS9 is in straight-forward position so that the pairs of relays R20 and R24, R21 and R25 in the straight-forward advancing case are replaced by pairs of relays R20 and R25, R21 and R24, respectively. The reason for this is that when the switch TS9 is in the straight-forward position, the relay R26-1 is not required to be energized by the ground level signal (at terminal 310) from the section (i+1) since the movable rails need not be moved, whereas when the switch TS9 is in the branching or joining position, the movable rails must be moved in response to the ground level signal from the terminal 310 of the section control circuit of the section (i+1) and accordingly its ground signal has to be applied to the relay R26 through the contact r17-2, on one hand, and the ground signal from the terminal 310 of the section control circuit of the branching section (i+1) is applied to the relay R20 through the contact r17-2, on the other hand, since the movable rails need not be moved. The circuit operation is similar to that during straight-forward position, and accordingly it will not be described further.

Referring back to FIG. 3C, a speed reduction magnet 443 is provided in the motor M2 circuit and the contact r13 of the relay R13 is connected therebetween so that when the movable rails are in the branching or joining position, the magnet is activated to provide stability and safety of the operation of the electromotive carrier when running on curved rails.

We claim:

1. A branching and joining apparatus for use in an automatic carrying system having a main rail and at least one sub-rail each provided with a power supply line and further having an electromotive carrier adapted to run on said rails, said apparatus being disposed at a location where said main rail and said sub-rail join together, and comprising:
- a fixed frame;
- a threaded shaft extending perpendicularly to said main rail and mounted slidably in a perforation of a vertical stationary supporting plate secured to said frame;
- a coil spring disposed about said shaft between said supporting plate and a washer attached to one end of said shaft so that the coil spring partially covers the length of said shaft;
- a drive motor of reversible type having its rotor rotatably fitted on said threaded shaft;
- a pair of integrally movable rails fixed to said motor and each having a predetermined length; and
- stopper means on said fixed frame which restrict the movement of travel of said movable rails in first and second directions perpendicular to said main rail, respectively;
- said drive motor being adapted, when rotated in a first direction, to move along said threaded shaft together with said movable rails without compressing said coil spring until one of said stopper means is engaged by one of said movable rails to stop the movement of the motor along the threaded shaft, and thereafter to compress said coil spring so that said movable rails are locked in a straight-forward position with said coil spring substantially compressed so as to bias said movable rails against the engaged stopper means, and, on the other hand, when rotated in a second direction, to move along said threaded shaft together with said movable rails in the opposite direction without stretching said coil spring until the other of said stopper means is engaged by a different one of said movable rails to stop the movement of the motor along the threaded shaft in the opposite direction, and thereafter to stretch said coil spring so that said movable rails are locked in a branching and joining position with said coil spring substantially stretched so as to bias said movable rails against the engaged stopper means.

2. A branching and joining apparatus according to claim 1 further comprising a detector for detecting the position of said movable rails, said position detector including a lever having a groove of predetermined length therein and the position of which is determined by the position of said shaft, a pair of contacting plates disposed in said groove so as to be movable axially within the groove, two pairs of contacting members disposed externally of said groove and adapted to be closed respectively by said contacting plates, and a spring disposed between said contacting plates within said groove and arranged so as to permit one pair of said contacting members to be closed by one of said contacting plates and the other pair of said contacting members to be closed by the other of said contacting plates when the spring assumes its free length, said position detector being arranged so that when said movable rails are positioned in the straight-forward position, said one pair of contacting members alone is closed by one contacting plate, and, on the other hand, when said movable rails are positioned in the braching and joining position, said other pair of contacting members alone is closed by the other contacting plate.

* * * * *